(12) United States Patent
Nakayama

(10) Patent No.: US 10,471,777 B2
(45) Date of Patent: Nov. 12, 2019

(54) PNEUMATIC TIRE

(71) Applicant: SUMITOMO RUBBER INDUSTRIES, LTD., Kobe-shi, Hyogo (JP)

(72) Inventor: Hiroyuki Nakayama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 587 days.

(21) Appl. No.: 14/971,564

(22) Filed: Dec. 16, 2015

(65) Prior Publication Data

US 2016/0193881 A1 Jul. 7, 2016

(30) Foreign Application Priority Data

Jan. 7, 2015 (JP) ................................ 2015-001844

(51) Int. Cl.
| | | |
|---|---|---|
| *B60C 11/11* | (2006.01) | |
| *B60C 11/03* | (2006.01) | |
| *B60C 11/13* | (2006.01) | |
| *B60C 11/12* | (2006.01) | |

(52) U.S. Cl.
CPC ...... *B60C 11/0309* (2013.01); *B60C 11/0306* (2013.01); *B60C 11/0332* (2013.01); *B60C 11/11* (2013.01); *B60C 11/1307* (2013.01); *B60C 2011/1209* (2013.01); *B60C 2011/1213* (2013.01); *B60C 2011/133* (2013.01)

(58) Field of Classification Search
CPC .............................. B60C 11/11; B60C 11/0306
See application file for complete search history.

(56) References Cited

U.S. PATENT DOCUMENTS

| | | | | |
|---|---|---|---|---|
| D381,945 S | * | 8/1997 | Manestar | ..................... D12/600 |
| 2012/0006456 A1 | * | 1/2012 | Koshio | ................... B60C 11/11 |
| | | | | 152/209.18 |
| 2012/0073715 A1 | | 3/2012 | Kawauchi | |
| 2016/0089939 A1 | * | 3/2016 | Oji | ........................... B60C 5/12 |
| | | | | 152/209.18 |

(Continued)

FOREIGN PATENT DOCUMENTS

| | | | | |
|---|---|---|---|---|
| DE | 3209167 A | * | 9/1983 | |
| EP | 3000622 A1 | | 3/2016 | |
| JP | 54-088503 A | * | 7/1979 | |

(Continued)

OTHER PUBLICATIONS

Machine translation for Japan 54-088503 (Year: 2018).*

(Continued)

*Primary Examiner* — Steven D Maki
(74) *Attorney, Agent, or Firm* — Birch, Stewart, Kolasch & Birch, LLP

(57) ABSTRACT

A pneumatic tire includes a tread portion including a plurality of tread blocks including at least one constricted block with a first recess disposed on axially one side of the block and a second recess disposed on axially other side of the block so as to form a narrow portion between the first recess and the second recess. Each of the first recess and the second recess includes a V-shaped top edge on a ground contacting surface of the block. Each of the V-shaped top edges protrudes toward a center of the block in a planar view of the block.

15 Claims, 6 Drawing Sheets

(56) References Cited

U.S. PATENT DOCUMENTS

2016/0121659 A1* 5/2016 Kageyama .......... B60C 11/1384
152/209.24

FOREIGN PATENT DOCUMENTS

| JP | 54-88503 A | | 7/1979 |
|---|---|---|---|
| JP | 63-061603 A | * | 3/1988 |
| JP | 6-143935 A | | 5/1994 |
| JP | 2005-138713 A | * | 6/2005 |
| JP | 2007-314137 A | * | 12/2007 |
| JP | 2012-66790 A | | 4/2012 |
| WO | WO-03/013881 A1 | * | 2/2003 |

OTHER PUBLICATIONS

Machine translation for Japan 2005-138713 (Year: 2018).*
Machine translation for Japan 2007-314137 (Year: 2018).*
Machine translation for Japan 63-061603 (Year: 2018).*
Machine translation for German 3209167 (Year: 2018).*
Extended European Search Report for European Application No. 15200723.3, dated May 6, 2016.

* cited by examiner

PNEUMATIC TIRE

BACKGROUND OF THE INVENTION

Field of the Invention

The present invention relates to pneumatic tires, and in particular, relates to a pneumatic tire capable of improving on-snow performance.

Description of the Related Art

Conventionally, pneumatic tires including a tread portion with a plurality of blocks separated by grooves have been proposed. For example, Japanese Unexamined Patent Application Publication No. 2012-066790 discloses a pneumatic tire including a tread block including recessed sidewalls.

Unfortunately, the tread block disclosed by the above document may not offer sufficient on-snow performance.

SUMMARY OF THE INVENTION

In view of the above problems in the conventional art, the present invention has an object to provide a pneumatic tire capable of improving on-snow performance.

According to one aspect of the present invention, a pneumatic tire includes a tread portion including a plurality of tread blocks including at least one constricted block. The constricted block includes a first recess disposed on axially one side of the block and a second recess disposed on axially other side of the block so as to form a narrow portion between the first recess and the second recess. Each of the first recess and the second recess includes a V-shaped top edge on a ground contacting surface of the block. Each of the V-shaped top edges protrudes toward a center of the block in a planar view of the block.

In another aspect of the invention, the first recess may be located on one side of a tire equator and the second recess may be located on the other side of the tire equator.

In another aspect of the invention, each of the V-shaped top edges includes a vertex, and the respective vertexes of the V-shaped top edges may be located in positions different from one another in a circumferential direction of the tire.

In another aspect of the invention, each of the V-shaped top edges may include a long inclined segment and a short inclined segment inclined in an opposite direction to the long inclined segment.

In another aspect of the invention, the V-shaped top edge of the first recess may include the long inclined segment in a one side thereof in a circumferential direction of the tire, and the V-shaped top edge of the second recess may include the long inclined segment in the other side thereof in the circumferential direction of the tire.

In another aspect of the invention, each of the V-shaped top edges may include a vertex angle in a range of from 80 to 110 degrees.

In another aspect of the invention, the at least one constricted block may further include a pair of lateral top edges each of which extends between the pair of top edges of the recesses at a circumferentially both ends of the block, and each of the lateral top edges may protrude circumferential outwardly of the block.

DESCRIPTION OF THE EMBODIMENTS

An embodiment of the present invention will be explained below with reference to the accompanying drawings.

Figure 1:
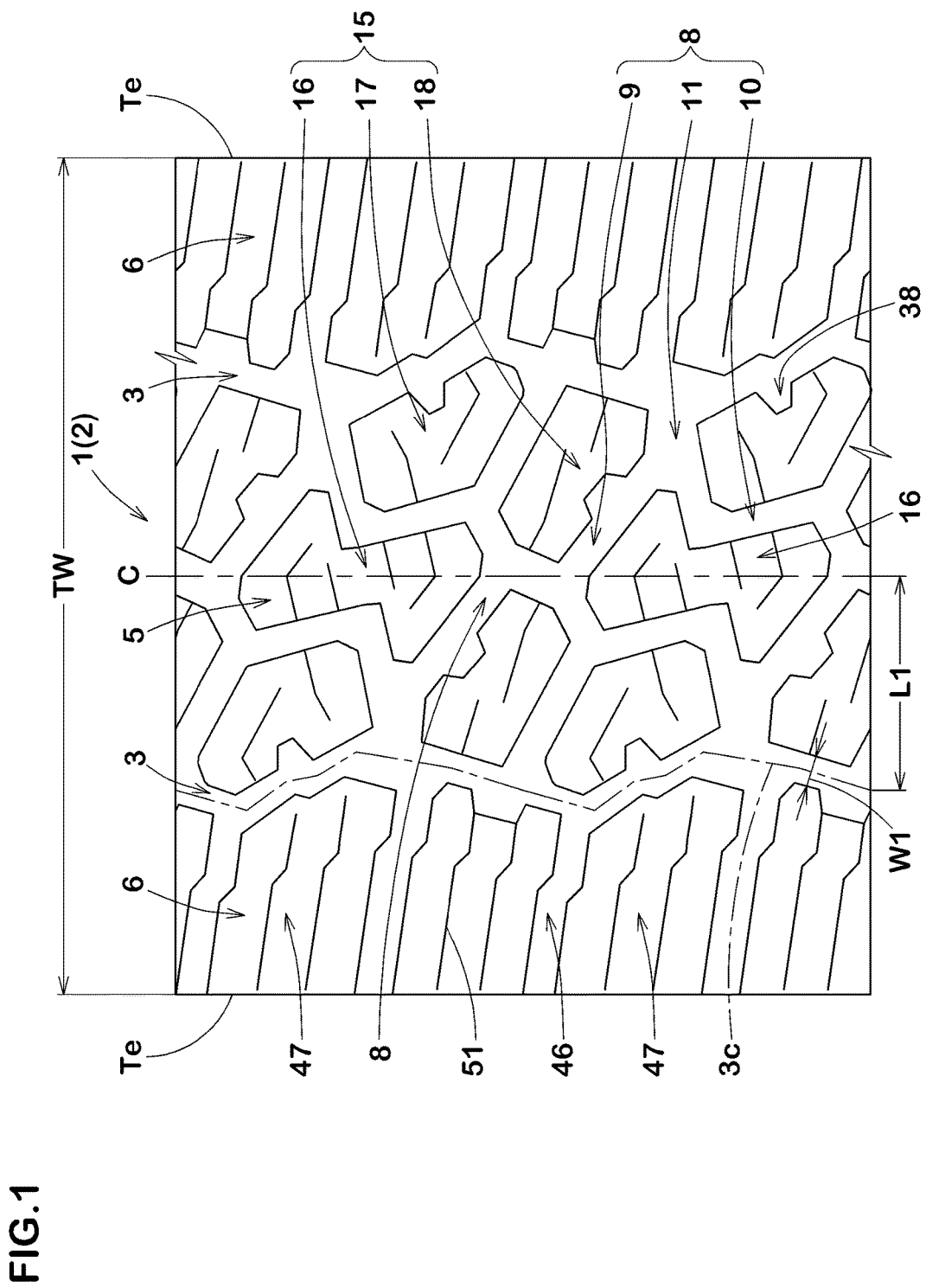
FIG. 1 is a development view of a tread portion of a pneumatic tire according to an embodiment of the present invention.

FIG. 1 illustrates a development view of a tread portion 2 of a pneumatic tire 1 according to an embodiment of the present invention. The pneumatic tire 1 according to the embodiment of the present invention may preferably be embodied as a tire for SUV which is suitably used to travel on rough terrains, for example.

As illustrated in FIG. 1, the tread portion 2 of the pneumatic tire 1 is provided with a pair of shoulder main grooves 3 and 3. Each of the shoulder main grooves 3 continuously extends in a circumferential direction of the tire in a zigzag shape at a location proximately to a tread edge Te on each side of a tire equator C.

Here, in each side of the tire equator C, the tread edge Te refers to an axially outermost edge of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

The tread width TW of the tire is defined as the width measured under a normally inflated unloaded condition, as the axial distance between the tread edges Te and Te. The normally inflated unloaded condition is such that the tire 1 is mounted on the standard wheel rim with the standard pressure but loaded with no tire load.

In this application including specification and claims, various dimensions, positions and the like of the tire refer to those under the normally inflated unloaded condition of the tire unless otherwise noted.

The shoulder main groove 3, for example, may have a width W1 in a range of from 2.5% to 5.0% the tread width TW. The shoulder main groove 3 may be arranged at the location where a groove centerline 3c thereof is located at an axial distance L1 in a range of from 0.20 to 0.28 times the tread width TW from the tire equator C in order to generate a large traction during traveling on snowy road by compressing snow in the groove strongly with a large ground contacting pressure.

The tread portion 2 includes a central portion 5 defined between the pair of shoulder main groove 3 and 3, and a pair of shoulder portions 6 each of which is arranged axially outwardly of each shoulder main groove 3.

Figure 2:
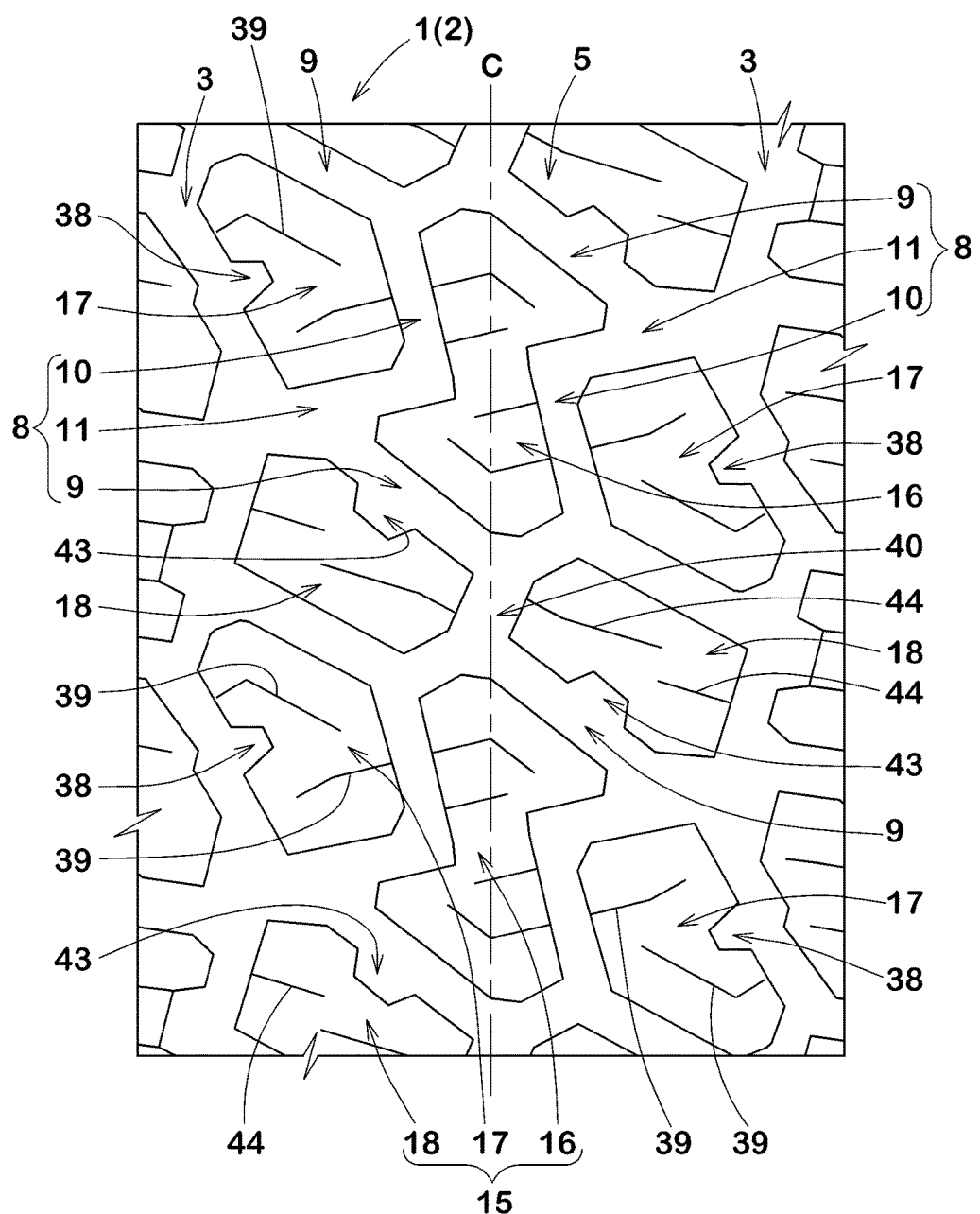
FIG. 2 is an enlarged view of a central portion illustrated in FIG. 1.

FIG. 2 illustrates an enlarged view of the central portion 5. As illustrated in FIG. 2, the central portion 5 is provided with a plurality of central lateral grooves 8 to form a plurality of blocks 15 therebetween.

Figure 3:
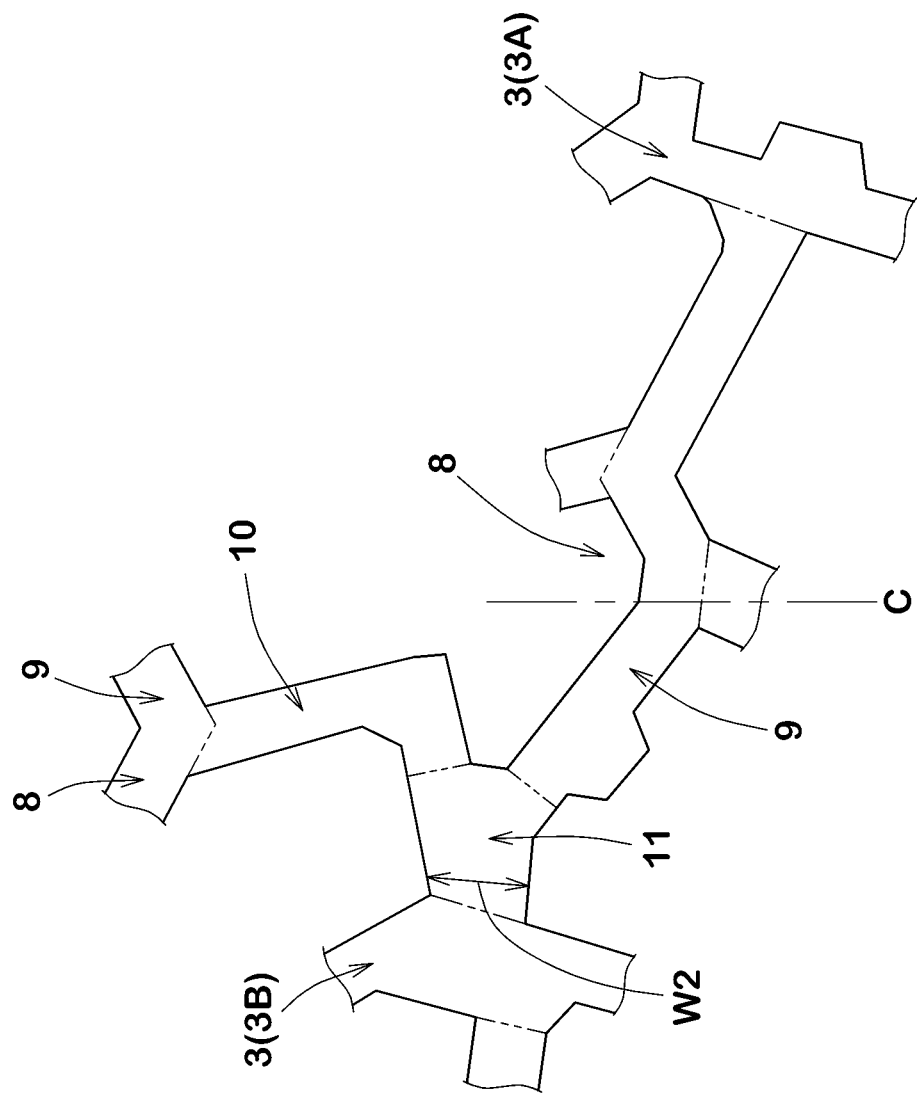
FIG. 3 is an enlarged view of a contour of a central lateral groove portion illustrated in FIG. 2.

FIG. 3 illustrates an enlarged view of a contour of the central lateral groove 8. As illustrated in FIG. 3, each of the central lateral grooves 8 includes a first section 9, a second section 10, and a junctional section 11 where the first section 9 and the second section 10 are joined.

In FIG. 3, the first section 9, for example, extends from the right side shoulder main groove 3A toward the left side shoulder main groove 3B and is connected thereto through the junctional section 11.

The second section 10, for example, is arranged between a pair of circumferentially adjacent first sections 9, wherein a first end of the second section 10 is connected to one junctional section 11 of one of the central lateral grooves 8 and a second end of the second section 10 is connected to the first section 9 of the other one of the central lateral grooves 8.

The junctional section 11 is arranged proximate to one of the shoulder main grooves 3. In this embodiment, the junctional section 11 has a pair of groove edges, wherein one groove edge is smoothly connected to a groove edge of the first section 9 and the other groove edge is smoothly connected to a groove edge of the second section 10. Preferably, the junctional section 11 has the width W2 greater than that of the shoulder main groove 3. Preferably, the width W2 of the junctional section 11 is in a range of from 1.1 to 1.4 times the width W1 (shown in FIG. 1) of the shoulder main groove 3. The junctional section 11 may be useful to improve on-snow performance by forming a large snow column therein to generate large traction.

As illustrated in FIG. 2, the central portion 5 is separated into a plurality of the tread blocks 15 by the central lateral grooves 8. In this embodiment, the tread blocks 15 on the central portion 5, for example, includes a first central block 16, a second central block 17 and a third central block 18.

The first central block 16 is formed among a pair of circumferentially adjacent first sections 9 and 9 and a pair of axially adjacent second sections 10 and 10.

Figure 4:
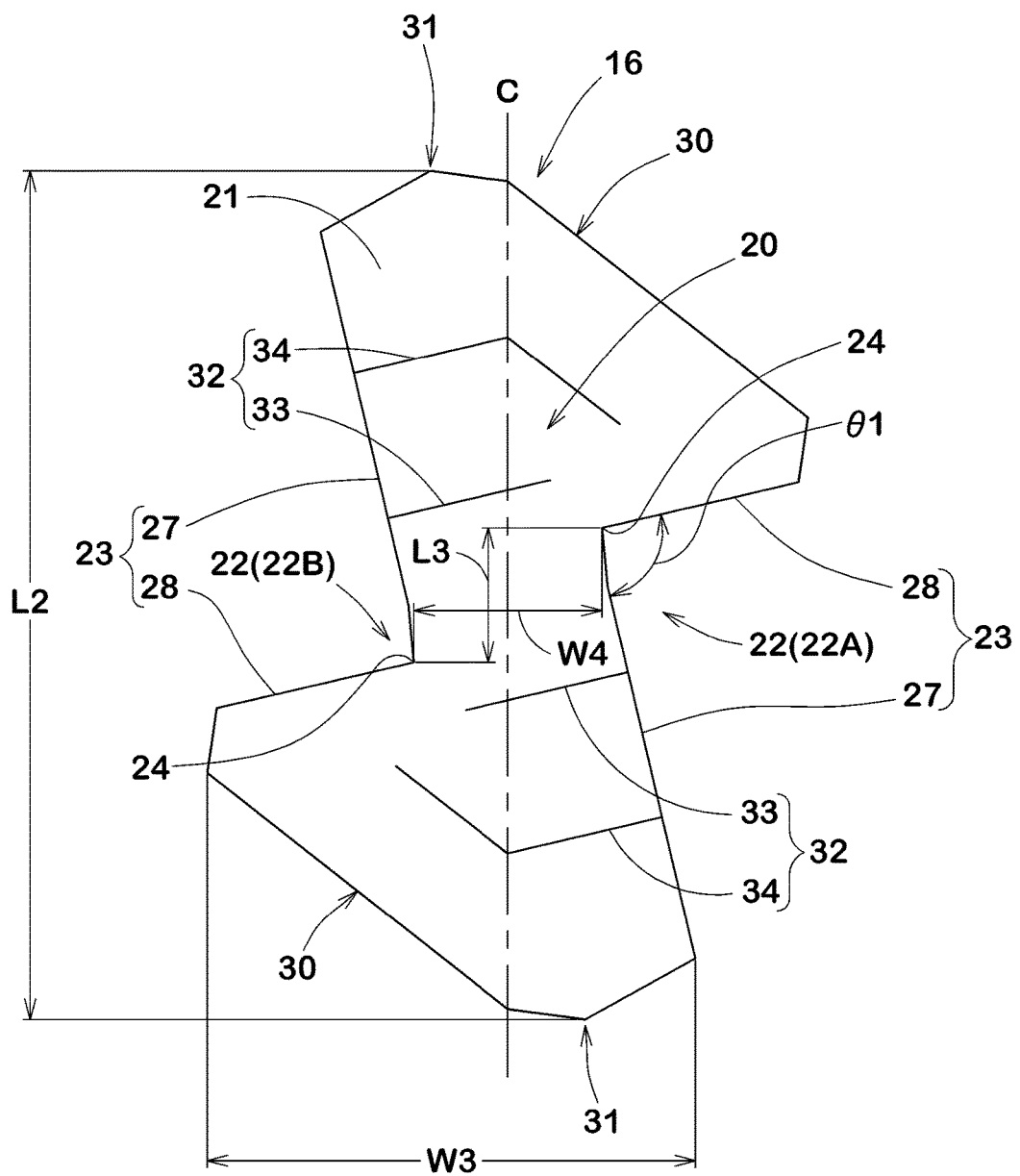
FIG. 4 is an enlarged view of a first central block illustrated in FIG. 2.

FIG. 4 illustrates an enlarged view of the first central block 16. As illustrated in FIG. 4, the first central block 16 is configured as a constricted block 20 having a pair of recesses 22 on axially both sides of the block so as to form a narrow portion therebetween.

Each of the recesses 22 of the constricted block 20 is defined by a V-shaped top edge 23 on a ground contacting surface 21 of the block, wherein each of the V-shaped top edges 23 protrudes toward a center of the block in a planar view of the block. The recesses 22 of the constricted block 20 may introduce snow therein when coming into contact with snowy road during traveling. Successively, compression deformation as a fulcrum of the vertex of the V-shaped top edge 23 is caused on the constricted block 20 by receiving tire load. Such compression deformation may further compress the snow held in each recess 22 so as to form a hard snow column therein, and then the constricted block 20 can shear it to generate a large traction on snowy road.

In this embodiment, the constricted blocks 20 are arranged on the tire equator C as the first central blocks 16. Thus, each of the constricted blocks 20 according to the embodiment includes a first recess 22A located on one side of the tire equator C and a second recess 22B located on the other side of the tire equator C. In this embodiment of the invention, the snow held in the respective recesses 22A and 22B can be subjected to a large ground contacting pressure which may compress the snow more strongly. Alternatively, the location of the constricted block 20 is not particularly limited to the aspect of the embodiment, but may be arranged on any places on the tread portion 2.

Preferably, the vertex 24 of the V-shaped top edge 23 of the first recess 22A may be located in a position different from the vertex 24 of the V-shaped top edge 23 of the second recess 22B in the circumferential direction of the tire. With this embodiment, relatively deformable positions of the constricted block 20 may be distributed in the circumferential direction of the tire so that large traction may be obtained in a circumferentially wide area of the block. Furthermore, it may be useful to prevent a crack caused on the vertexes 24.

In order to improve on-snow performance while preventing a crack in the block, the circumferential distance L3 between vertexes 24 is preferably in a range of not less than 0.14 times, more preferably not less than 0.14 times, but preferably not more than 0.22 times, more preferably not more than 0.18 times the circumferential maximum length L2 of the constricted block 20.

In this embodiment, each of the V-shaped top edge 23 includes a long inclined segment 27 and a short inclined segment 28 inclined in an opposite direction to the long inclined segment 27.

In both of the first recess 22A and the second recess 22B, the respective long inclined segments 27 are preferably inclined in the same direction, and more preferably are arranged in parallel one another.

Preferably, the V-shaped top edge 23 of the first recess 22A comprises the long inclined segment 27 in one side thereof in the circumferential direction of the tire, and the V-shaped top edge 23 of the second recess 22B comprises the long inclined segment 27 in the other side thereof in the circumferential direction of the tire. With this embodiment, on-ice performance of the tire may be improved by offering edge effect in various directions.

In both of the first recess 22A and the second recess 22B, the respective short inclined segments 28 are preferably inclined in the same direction, and more preferably are arranged in parallel one another.

Preferably, each of the V-shaped top edges 23 includes a vertex angle θ1, which is formed between the long inclined segment 27 and the short inclined segment 28, in a range of not less than 80 degrees, more preferably not less than 90 degrees, but preferably not more than 110 degrees, more preferably not more than 100 degrees in order to improve the advantageous effects described above while ensuring durability of the block.

The ground contacting surface 21 of the constricted block 20 includes a pair of lateral top edges 30 and 30 each of which connects both V-shaped top edges 23 and 23 at circumferentially both ends of the block.

Preferably, each of the lateral top edges 30 protrudes circumferentially outwardly of the block. More preferably, the lateral top edges 30 have the respective vertexes 31 and 31 which protrude outwardly and are located in positions different from one another in the axial direction of the tire in order to promote deformation of the block in the circumferential direction of the tire to compress the snow in the recesses strongly.

Preferably, the constricted block 20 has the minimum width W4 which is an axial distance between the vertexes 24, for example, is in a range of not less than 0.30 times, more preferably not less than 0.35 times, but preferably not more than 0.45 times the maximum axial width W3 of the constricted block 20 in order to improve on-snow performance while ensuring durability of the block.

Preferably, the maximum axial width W3 of the constricted block 20, for example, is in a range of from 0.15 to 0.25 times the tread width TW in order to effectively improve on-snow performance as well as wear resistance.

In this embodiment, the constricted block 20 is provided with at least one, preferably a plurality of sipes 32 that extend from either one of the first recess 22A or the second recess 2B and terminates within the constricted block 20. Here, a sipe means a cut, slit or the like that has a width of from about 0.5 to 1.5 mm.

Preferably, each sipe 32 is connected to the long inclined segment 27 of the first recess 22A or the second recess 22B. Such a sipe 32 may provide a suitably balanced rigidity for the block.

In this embodiment, the sipes 32, for example, include a first sipe 33 extending linearly and a second sipe 34 extending in a bent shape. Preferably, one first sipe 33 and one second sipe 34 are arranged on each recess 22.

Preferably, the second sipe 34, for example, include a portion that extends in parallel with the lateral top edge 30 of the constricted block 20 at least partially. Furthermore, the second sipe 34 may be arranged outwardly of the first sipe 33 in the circumferential direction of the block in order to uniform rigidity of the constricted block 20 to prevent uneven wear of the block.

As illustrated in FIG. 2, a pair of second central blocks 17, for example, are arranged on axially both sides of each first central block 16. The second central block 17 is defined among a pair of the first sections 9, one of the second sections 10, one of the junctional sections 11 and one of the shoulder main grooves 3. The second central block 17, for example, is provided with a slot 38 extending axially inwardly from the shoulder main groove 3 and terminating within the block.

The slot 38 has a width decreasing gradually toward the tire equator C, wherein the width is measured along a part of the groove edge of the shoulder main groove 3 to which the slot 38 connects. Such a slot 38 may compress the snow strongly to be introduced therein, thereby increasing traction on snowy road.

The second central block 17 is provided with a plurality of second central sipes 39 extending from either the shoulder main groove 3 or the central lateral groove 8 and terminating within the block. Preferably, the second central sipes 39, for example, extend in a bent shape to offer edge effect in various directions.

In this embodiment, the third central block 18 is defined among a pair of the first sections 9 and 9, one of the shoulder main grooves 3, and a connecting groove 40 arranged on the tire equator C and connecting the first sections 9 and 9 one another. The third central block 18 is provided with a slot 43 extending from one of the first section 9. The slot 43 of the third central block 18 has a width gradually decreasing toward the inside of the block.

The third central block 18 is provided with a third central sipe 44 extending from either the shoulder main groove 3 or the connecting groove 40 and terminating within the block.

The third central block 18 with the sipe may ensure rigidity of the block to improve steering stability on dry road while offering edge effect to improve on-ice performance.

Figure 5:
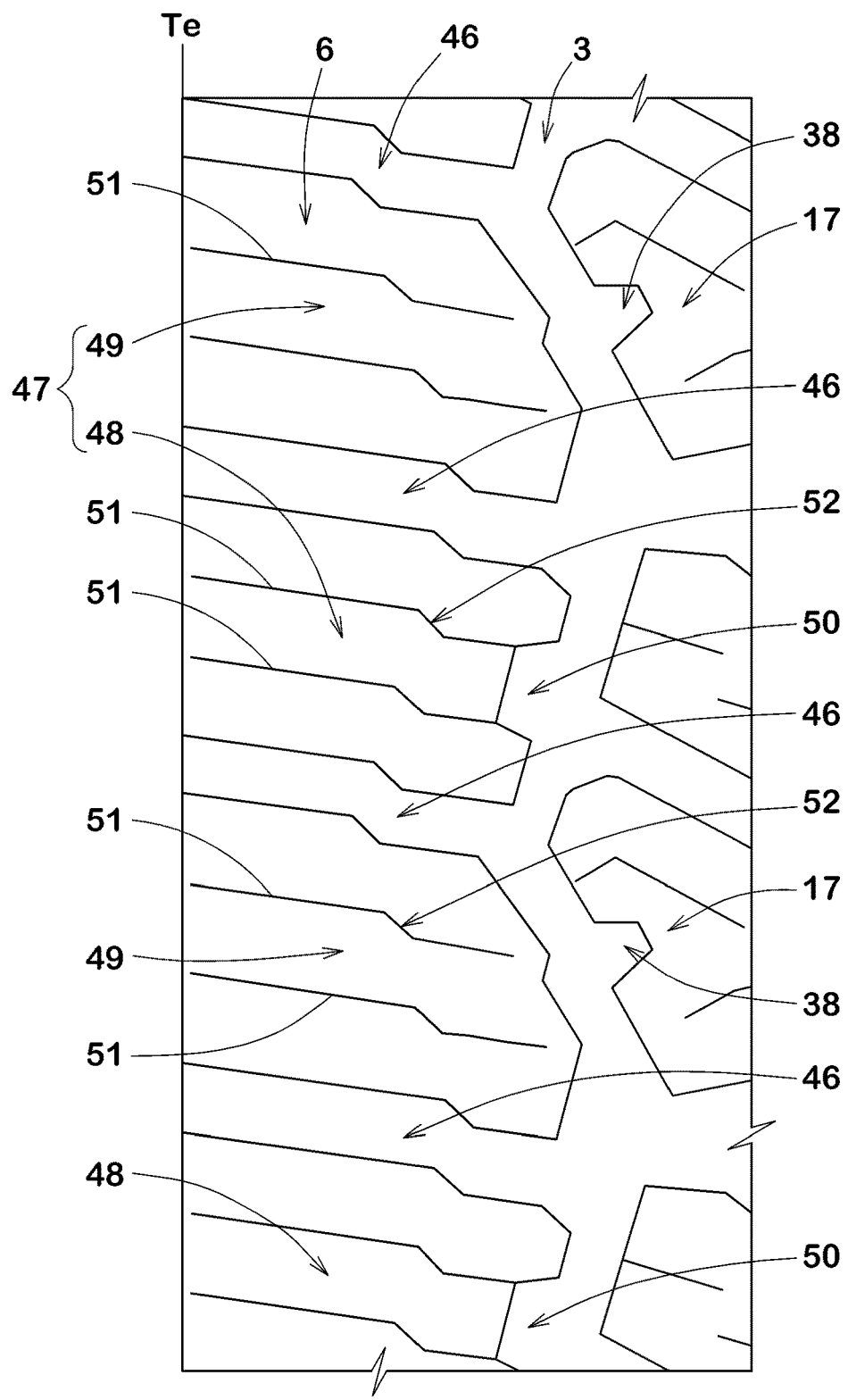
FIG. 5 is an enlarged view of a shoulder portion illustrated in FIG. 1.

FIG. 5 illustrates an enlarged view of the shoulder portion 6. As illustrated in FIG. 5, the shoulder portion 6 is provided with a plurality of shoulder lateral grooves 46 each of which extends axially outwardly from the shoulder main groove 3 to form a plurality of shoulder blocks 47. In this embodiment, each shoulder lateral groove 46 extends from the shoulder main groove 3 to the tread edge Te.

The shoulder blocks 47, for example, include a first shoulder block 48 and a second shoulder block 49, and which are alternately arranged in the circumferential direction of the tire.

The first shoulder block 48 is provided with a slot 50 that extends axially outwardly from the shoulder main groove 3. The slot 50 may be useful to compress the snow introduced in the shoulder main groove 3.

The second shoulder block 49, for example, has no slot and is arranged axially outwardly of the second central block 17 so as to face the slot thereof. With this configuration, rigidity of the shoulder portion 6 may be ensured and therefore steering stability on dry road may be improved.

The first shoulder block 48 and the second shoulder block 49, for example, are provided with a shoulder sipe 51 extending in the axial direction of the tire.

The shoulder sipe 51 arranged on the first shoulder block 48 extends from the tread edge Te to the slot 50. The shoulder sipe 51 arranged on the second shoulder block 49, for example, extends axially inwardly from the tread edge Te and terminates within the second shoulder block 49. Such a shoulder sipe 51 may offer excellent edge effect while preventing uneven wear of the block.

preferably, each shoulder sipe 51 includes at least one bent portion 52 in order to improve on-ice performance by increasing friction.

While the particularly preferable embodiments in accordance with the present invention have been described in detail, the present invention is not limited to the illustrated embodiments, but can be modified and carried out in various aspects.

EXAMPLE

Pneumatic tires for SUV having a size 265/70R17 and a basic pattern illustrated in FIG. 1 were manufactured based on details shown in Table 1. As comparative example, a pneumatic tire with a tread pattern illustrated in FIG. 6, which is not provided with any constricted blocks, was also manufactured. Then, on-snow performance and wear resistance thereof were tested. The common specifications of tires and test procedures are as follows.

Rim: 17×7.5
Internal pressure of tires: 220 kPa
Test vehicle: Four-wheel drive vehicle with displacement of 2400 cc
Tire location: All wheels
On-snow performance test:
On a test course covered with compressed snow, a distance for requiring to accelerate the velocity of the test vehicle from 5 km/h to 20 km/h was measured using GPS.

Test results are indicated using an index Ref. 1 being 100. The smaller the value, the better the on-snow performance is.

Wear Resistance Test:
The amount of wear of the tread portion was measured after traveling for a certain distance on dry road. The test results are indicated using an index Ref. 1 being 100. The smaller the value, the better the wear resistance is.

Test results are shown in Table 1. From the test results of Table 1, it was confirmed that the tires of the example embodiment had excellent on-snow performance and wear resistance.

TABLE 1

Figure 6:
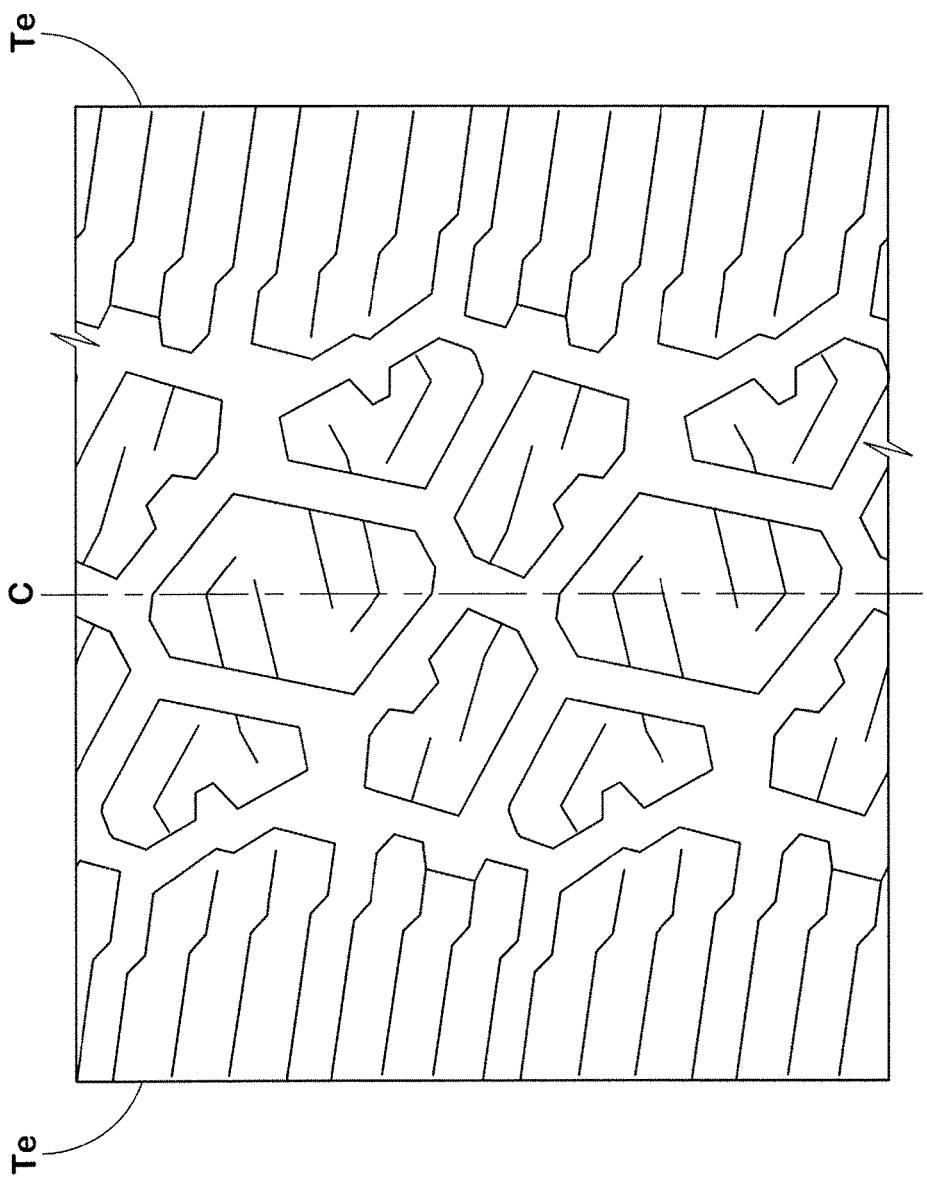
FIG. 6 is a development view of a tread portion of a conventional pneumatic tire.

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Tread pattern | FIG. 6 | FIG. 1 | FIG. 1 | FIG. 1 | FIG. 1 | FIG. 1 | FIG. 1 | FIG. 1 |
| Maximum width W3 of constricted block/tread width TW | — | 0.2 | 0.15 | 0.25 | 0.2 | 0.2 | 0.2 | 0.2 |
| Minimum width W4 of constricted block/maximum width W3 of constricted block | — | 0.38 | 0.38 | 0.38 | 0.3 | 0.35 | 0.4 | 0.45 |
| Distance L3/length L2 | — | 0.16 | 0.16 | 0.16 | 0.16 | 0.16 | 0.16 | 0.16 |
| Vertex angle of V-shaped top edge θ1 (deg.) | — | 92 | 92 | 92 | 92 | 92 | 92 | 92 |
| On-snow performance (Index) | 100 | 88 | 88 | 90 | 91 | 89 | 88 | 87 |
| Wear resistance (Index) | 100 | 95 | 97 | 94 | 94 | 94 | 96 | 99 |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 |
| Maximum width W3 of constricted block/tread width TW | 0.2 | 0.2 | 0.2 | 0.2 | 0.2 | 0.2 | 0.2 | 0.2 |
| Minimum width W4 of constricted block/maximum width W3 of constricted block | 0.38 | 0.38 | 0.38 | 0.38 | 0.38 | 0.38 | 0.38 | 0.38 |
| Distance L3/length L2 | 0.1 | 0.14 | 0.18 | 0.22 | 0.16 | 0.16 | 0.16 | 0.16 |
| Vertex angle of V-shaped top edge θ1 (deg.) | 92 | 92 | 92 | 92 | 80 | 90 | 100 | 110 |
| On-snow performance (Index) | 93 | 90 | 87 | 87 | 87 | 88 | 90 | 92 |
| Wear resistance (Index) | 94 | 94 | 97 | 99 | 99 | 96 | 95 | 95 |

What is claimed is:

1. A pneumatic tire comprising:
a tread portion comprising a plurality of tread blocks comprising at least one constricted block having a first recess disposed on axially one side of the block and a second recess disposed on axially other side of the block so as to form a narrow portion between the first recess and the second recess;
each of the first recess and the second recess comprising a V-shaped top edge comprising a vertex on a ground contacting surface of the block;
the V-shaped top edge of each of the first recess and the second recess comprising a long inclined segment and a short inclined segment inclined in an opposite direction to the long inclined segment, the short inclined segment having a segment end on an opposite side of the vertex and the long inclined segment having a segment end on an opposite side of the vertex, wherein the segment end of the short inclined segment is located outwardly of the segment end of the long inclined segment in a block width direction, and
each of the V-shaped top edges protruding toward a center of the block in a planar view of the block such that an axial distance between the vertexes of the V-shaped top edges of the first and second recesses is in a range of from 0.30 to 0.45 times a maximum axial width of the constricted block,
wherein another block is disposed adjacent to the constricted block such that a part of the another block crosses a line drawn between the segment ends of the short and long inclined segments of the first or second recess.

2. The pneumatic tire according to claim 1, wherein the first recess is located on one side of a tire equator and the second recess is located on the other side of the tire equator.

3. The pneumatic tire according to claim 2, wherein the at least one constricted block further comprises a pair of lateral top edges each of which extends between the pair of top edges of the recesses at a circumferentially both ends of the block, and
each short inclined segment is arranged such that a tapered portion extending outwardly in the block width direction is formed between the short inclined segment and a respective one of the pair of lateral top edges.

4. The pneumatic tire according to claim 3, wherein the short inclined segment is inclined with respect to a tire axial direction.

5. The pneumatic tire according to claim 2, wherein
the plurality of tread blocks further comprises adjacent constricted blocks in a tire circumferential direction and axially adjacent two third blocks arranged between the adjacent constricted blocks, and
the third blocks each have an axial length longer than a circumferential length.

6. The pneumatic tire according to claim 5, wherein one of the third blocks has a slot extending from a peripheral edge of the block on a first circumferential side and the other one of the third blocks has a slot extending from a peripheral edge of the block on a second circumferential side.

7. The pneumatic tire according to claim 2, wherein
the at least one constricted block is provided with sipes that extend from the first recess and terminate within the at least one constricted block, and
the sipes comprise a first sipe extending linearly and a second sipe which bends at the tire equator.

8. The pneumatic tire according to claim 7, wherein the second sipe comprises two inclined segments which are inclined in a direction opposite to each other with respect to a tire axial direction.

9. The pneumatic tire according to claim 1, wherein the respective vertexes of the V-shaped top edges are located in positions different from one another in a circumferential direction of the tire.

10. The pneumatic tire according to claim 1, wherein the V-shaped top edge of the first recess comprises the long inclined segment in a one side thereof in a circumferential direction of the tire, and the V-shaped top edge of the second recess comprises the long inclined segment in the other side thereof in the circumferential direction of the tire.

11. The pneumatic tire according to claim 1, wherein each of the V-shaped top edges comprises a vertex angle in a range of from 80 to 110 degrees.

12. The pneumatic tire according to claim 1,
wherein the at least one constricted block further comprises a pair of lateral top edges each of which extends between the pair of top edges of the recesses at a circumferentially both ends of the block, and
wherein each of the lateral top edges protrudes circumferential outwardly of the block.

13. The pneumatic tire according to claim 1, wherein the at least one constricted block is provided with sipes that extend from the first recess and terminate within the at least one constricted block.

14. The pneumatic tire according to claim 13, wherein the sipes comprise a first sipe extending linearly and a second sipe extending in a bent shape.

15. The pneumatic tire according to claim 14,
wherein the at least one constricted block further comprises a pair of lateral top edges each of which extends between the pair of top edges of the recesses at a circumferentially both ends of the block, and
wherein the second sipe comprises a portion that extends in parallel with one of the lateral top edges.

\* \* \* \* \*